April 12, 1927.                1,624,409
G. W. HEISE ET AL
DRY CELL AND ELECTRODE THEREFOR
Filed Dec. 31, 1923
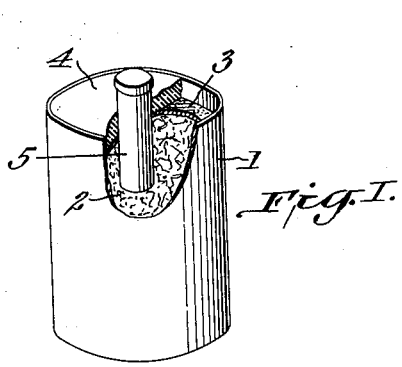
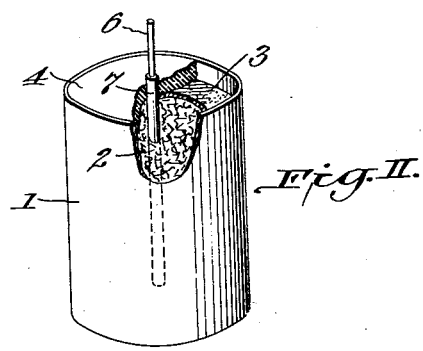
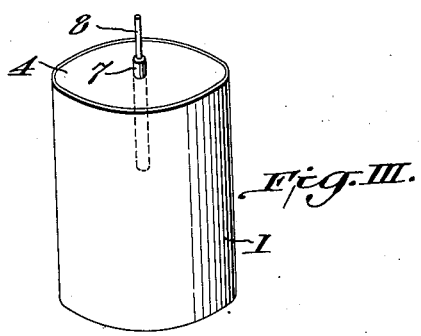
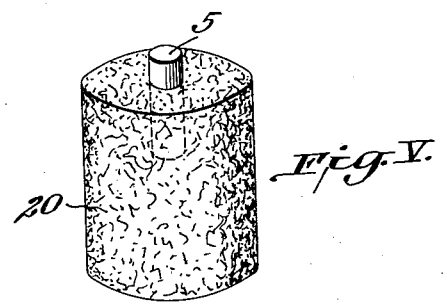
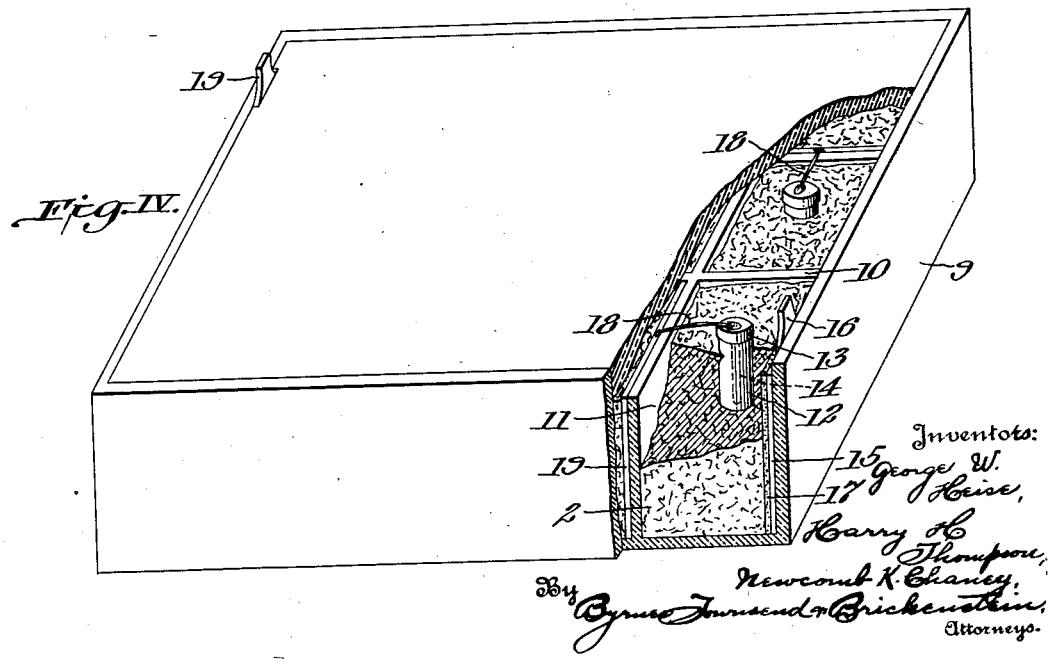
Inventors:
George W. Heise,
Harry H. Thompson,
Newcomb K. Chaney,
By Byrne Townsend & Brickenstein,
Attorneys.

Patented Apr. 12, 1927.

1,624,409

UNITED STATES PATENT OFFICE.

GEORGE W. HEISE, OF BAYSIDE, NEW YORK; HARRY H. THOMPSON, OF CLEVELAND, OHIO; AND NEWCOMB K. CHANEY, OF KEW GARDENS, NEW YORK, ASSIGNORS TO NATIONAL CARBON COMPANY, INC., A CORPORATION OF NEW YORK.

DRY CELL AND ELECTRODE THEREFOR.

Application filed December 31, 1923. Serial No. 683,750.

This invention relates to galvanic cells and comprises the provision of a carbon rod or equivalent electrode occupying as small a part of the cell space as is consistent with efficient service on low current drain. The invention is primarily intended for use in small dry cells of the Leclanché type, and is particularly applicable in cells to be used in "B" batteries for radio reception.

Service on low drain is approximately proportional to the amounts of depolarizing mix and electrolyte in the cell. Since it is important from the commercial standpoint that the cell volume should be small, the space for mix and electrolyte is ordinarily restricted. It frequently happens, therefore, that exhaustion of one of these active elements puts a premature end to the activity of the cell.

We have discovered that the carbon rod electrodes commonly used are unnecessarily large. By substituting small electrodes of the described herein, we are able to increase materially the amounts of mix and electrolyte in the cell, without substantial detrimental effect on internal resistance, or other factors influencing service.

The invention will be further described in connection with the accompanying drawing, in which—

Fig. I is a perspective view, partly broken away, showing a short carbon rod electrode;

Fig. II is a similar view, a coated metal electrode being employed;

Fig. III is a perspective view, illustrating a short electrode similar to that of Fig. II;

Fig. IV is a perspective view, partly broken away, showing a "B" battery assembly; and Fig. V is a perspective view of a mix bobbin.

Referring to Fig. I, numeral 1 denotes a container electrode of zinc or other suitable metal. This is illustrated as a cylinder, but it may be of any desired shape. The container is provided with a body of depolarizing mix 2, and is suitably sealed, as by a pulpboard washer 3 and plastic layer 4.

The central electrode 5 is a short carbon rod penetrating the mix to a sufficient depth to secure adequate electrical contact with it. When coherent depolarizing bodies are used, it is generally desirable that the carbon rod traverse about a third of the thickness of the mix, as shown. Even shorter carbon electrodes may be used advantageously with tamped depolarizing compositions, especially when the cells are to be assembled in a box and will not be subjected individually to handling. Such shorter electrodes may be pressed upon or into the mix to secure adequate contact. The length of the carbon rods should not much exceed one-half the thickness of the mix; a greater length results in the displacement of too much of the active materials, without compensating advantage.

When electrodes of the type described are used, it is possible to drive them into relatively compact bodies of mix, without substantial danger of breaking the electrodes. Punching to remove a portion of the mix and form a cavity, frequently required when long rods are to be inserted, is not required. Omission of this step facilitates manufacture, and in addition the compacting of the mix by forcing in the rod results in a further increase of the amount of mix in the cell.

Bobbins or other molded bodies of mix provided with short carbon rods are ordinarily strong and coherent enough to be handled and assembled without danger of displacing the rods. The mix may be made up with a suitable proportion of asbestos fiber to increase coherence, if desired. Also, the rods may be fluted, corrugated, or otherwise shaped to increase their effective engagement with the mix. The diameter of the carbon rods should not be much less than that illustrated. Thinner rods are generally too fragile.

In the form of the invention illustrated in Fig. II, a metallic core 6, coated with an impervious coductive material 7, is the central electrode. The core may be a metallic rod, tube, wire, narrow elongated plate, or the like, and will be referred to for brevity as a rod-like member. Since this type of electrode occupies but little room, it may extend practically to the bottom of the mix, without much sacrifice of valuable space. However, a shorter coated rod-like member answers all purposes. Such a member, 8, is shown in Fig. III. The member may be bent or twisted to anchor it more firmly in the mix, if desired.

The coating material 7 may advantageously be a carbon-containing plastic composition of the type described in the patent of C. S. Rider et al., No. 1,508,987, dated Sept. 16, 1924. A typical composition is: 170 parts rosin, 30 parts boiled linseed oil, 300 parts graphite (about 30 mesh fineness), 50 parts graphite (about 100 mesh fineness).

The battery shown in Fig. IV comprises a casing 9 having partition walls 10 forming compartments 11. Any suitable arrangement and conformation of the compartments may be adopted. Three rows of five compartments each is desirable in making up "B" batteries. Short carbon electrodes 12, which may each have a brass cap 13, are placed in the depolarizing mix 2, as previously described. The carbon electrodes 12 may have a metallic core 14, to increase their conductivity. Coated wire electrodes of the type shown in Figs II and III may be used instead of the carbon rods.

The battery has a terminal electrode 15 consisting of a zinc plate having a lug 16 adapted to be secured to a lead wire, or to carry a binding post, spring clip, or the like. A sheet of pulpboard 17, or equivalent material, spaces the zinc from the mix. Carbon rods 12 are connected by wires 18 to the zinc electrodes 19, to establish series connection throughout the battery. Various other circuit arrangements may be made, if desired. The other terminal electrode 19 may be a plate of carbon, metal coated with a carbonaceous composition, or other suitable body.

In Fig. V one form of mix bobbin 20 is illustrated. The bobbin may be wrapped in cloth or protected in any other suitable way. However, it is sufficiently coherent to be used ordinarily without a wrapping or the like.

Cells having the improved electrodes do not show any objectionable increase in their internal resistance, and they may be subjected to all ordinary handling without danger of displacing the central electrode. The additional amount of mix and electrolyte, which can be accommodated because of the small size of this electrode, results in a desirable increase in service.

The specific forms shown are illustrative only and various changes may be made within the scope of the appended claims.

We claim:

1. In a galvanic cell, a metallic electrode, a body of depolarizing material, and an electrode of opposite polarity having a relatively small volume and extending through not substantially more than one-half of said body, whereby the space available for active materials is increased.

2. In a galvanic cell, a metallic electrode, a body of depolarizing material, and an electrode of opposite polarity having a relatively small volume extending through about one-third only of said body, whereby the space available for active material is increased.

3. In a dry cell, a metallic electrode, an electrode of opposite polarity adjacent the upper end of the metallic electrode and having a length less than half that of said electrode, and depolarizing mix and electrolyte about and beneath the said electrode of opposite polarity.

4. In a dry cell, a metallic electrode, a body of depolarizing material, and an electrode embedded in said depolarizing material comprising a rod-like member coated with a thin layer of an impervious, conductive composition electronegative to the metallic electrode, said rod-like member having a relatively small volume, whereby the space available for active materials is increased.

5. The invention according to claim 4, in which the rod-like member extends through approximately one-third only of the depolarizing body.

6. In a dry cell, a metallic electrode, a body of depolarizing material, and an electrode embedded in said depolarizing material comprising a wire coated with a conductive, carbonaceous composition.

In testimony whereof, we affix our signatures.

GEORGE W. HEISE.
NEWCOMB K. CHANEY.

In testimony whereof, I affix my signature.

HARRY H. THOMPSON.